(12) United States Patent
Meadows et al.

(10) Patent No.: US 11,497,349 B2
(45) Date of Patent: Nov. 15, 2022

(54) INDIRECT AIR FLOW SYSTEM

(71) Applicant: Dansons US, LLC, Phoenix, AZ (US)

(72) Inventors: Glen Meadows, Gilbert, AZ (US); Paul Simon, Elizabethtown, KY (US); Michael Giebel, Joplin, MO (US)

(73) Assignee: Dansons US, LLC, Scottsdale, AZ (US)

(*) Notice: Subject to any disclaimer, the term of this patent is extended or adjusted under 35 U.S.C. 154(b) by 518 days.

(21) Appl. No.: 16/709,543

(22) Filed: Dec. 10, 2019

(65) Prior Publication Data

US 2021/0169269 A1    Jun. 10, 2021

(51) Int. Cl.
*A47J 37/07*    (2006.01)
*A23B 4/052*    (2006.01)

(52) U.S. Cl.
CPC ........ *A47J 37/0754* (2013.01); *A23B 4/0523* (2013.01); *A47J 37/0718* (2013.01); *A23V 2002/00* (2013.01)

(58) Field of Classification Search
CPC ............... A47J 37/0786; A47J 37/0754; A47J 37/0718; A47J 37/0722; A23B 4/0523; A23B 4/052; A23V 2002/00
See application file for complete search history.

(56) References Cited

U.S. PATENT DOCUMENTS

| 3,658,047 A | 4/1972 | Happel |
| 2017/0042168 A1 | 2/2017 | Ahmed |

FOREIGN PATENT DOCUMENTS

| EP | 2986130 | 11/2015 |
| WO | 2015175366 | 11/2015 |

OTHER PUBLICATIONS

Australian Examination Report No. 1 for Application No. 2020286227, dated Jan. 11, 2022, 3 pages.
Canadian Office Action for Application No. 3,102,207, dated Feb. 10, 2022, 3 pages.
European Search Report for Application No. EP20212650.4 dated Mar. 5, 2021, 9 pages.

*Primary Examiner* — Alfred Basichas
(74) *Attorney, Agent, or Firm* — Seyfarth Shaw LLP

(57) ABSTRACT

Disclosed is an outdoor cooking appliance with ductwork that directs heat and smoke more evenly in the cook chamber of the appliance. For example, the ductwork can extend from the heat source of the appliance and direct the smoke to openings in rack holders that then dispel the smoke into the cook chamber more evenly. The burn pot assembly can also be segregated from the grease pan to avoid the potential for grease fires.

19 Claims, 7 Drawing Sheets

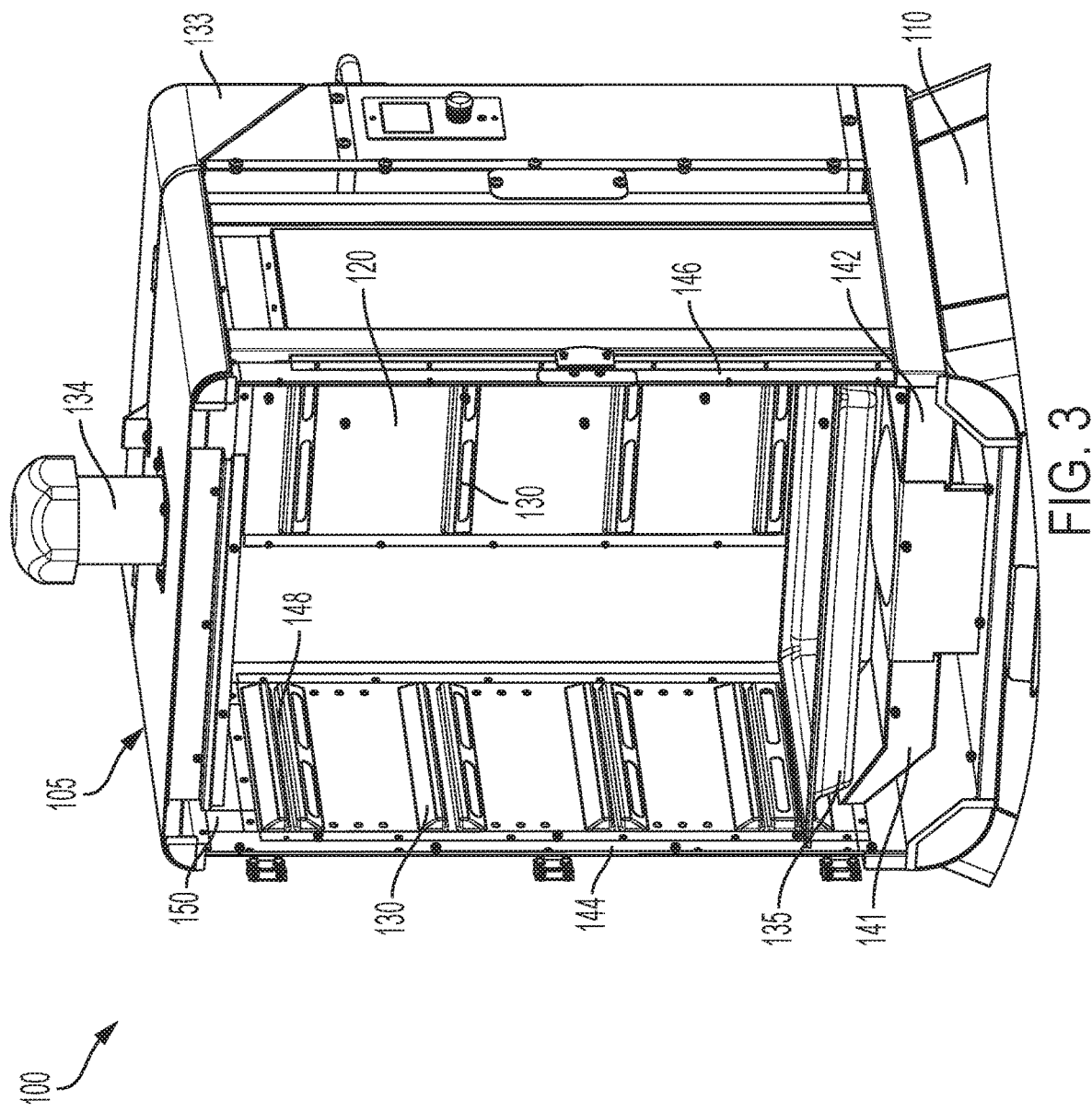

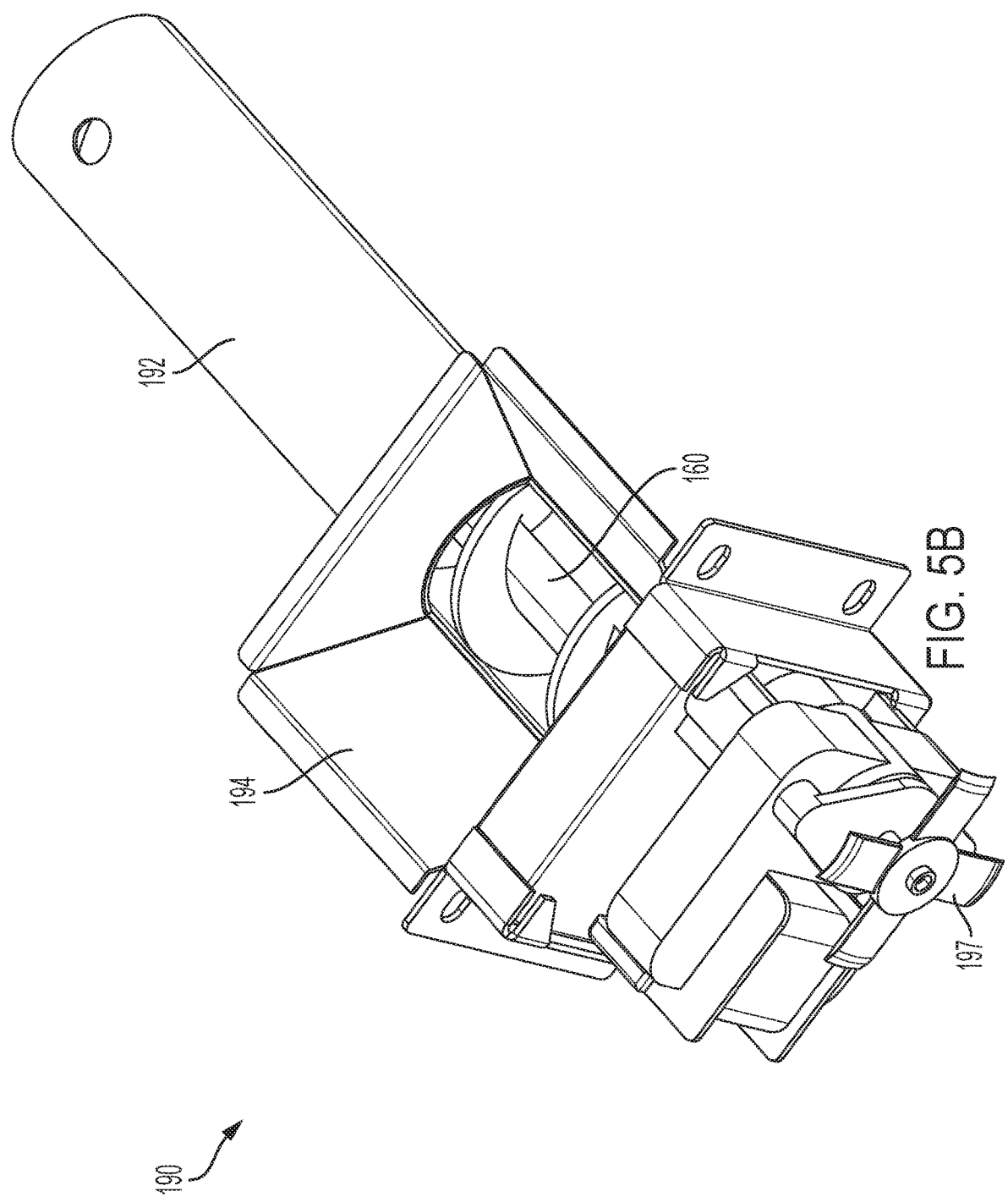

INDIRECT AIR FLOW SYSTEM

TECHNICAL FIELD OF THE INVENTION

The presently disclosed embodiments relate generally to grills and smokers. More particularly, the presently disclosed embodiments relate to grills and smokers with an air flow system designed to evenly direct air and smoke into a cook chamber of the appliance.

BACKGROUND OF THE INVENTION

Smokers are a common outdoor cooking appliance that burn fuel at a low temperature to cause smoke to flow into a cook chamber. The smoke not only cooks the meat within the cook chamber but also provides flavor during the cooking process. Grills can use a similar process to burn fuel, typically at higher temperatures, to likewise provide a flavor to the food that is difficult to obtain using a conventional indoor cooking appliance.

Pellet grills and smokers are common types of appliances used for cooking meat or other food. These appliances burn pellets of wood based on a temperature of the cook chamber. A user can operate a controller to set the temperature of the cook chamber and the appliance will then burn pellets until the temperature is reached. Thereafter, the appliance will sense that the desired temperature has been reached and will temporarily halt the supply of pellets to avoid going above the desired temperature, similar to a thermostat system.

Pellet grills and smokers typically include a burn pot assembly located at a bottom and center area of the appliance that directs heat and smoke upward. Some of these appliances struggle to direct heat and smoke to the entirety of the cook chamber due to the central nature of the burn pot assembly.

SUMMARY OF THE INVENTION

The presently disclosed embodiments include an appliance with ductwork extending from a burn pot assembly and leading to racks within the appliance to direct the smoke inward. In particular, the racks can include openings that direct the smoke into the smoker and more evenly distribute the smoke for better cooking results. The burn pot assembly can also be segregated from the grease pan to avoid the potential for grease fires.

In particular, the presently disclosed embodiments include an appliance including a main body defining an internal cooking chamber, a burn pot assembly that provides heat to the cooking chamber, a duct that extends from the burn pot assembly, and a passage extending alongside a portion of an outer periphery of the cooking chamber and communicating with the duct. The passage begins at a lower end of the cooking chamber proximate the burn pot assembly and extends toward an upper end of the cooking chamber opposite the lower end. Openings are provided for communicating the passage with the cooking chamber to provide a path for air flow from the burn pot assembly to the cooking chamber.

The presently disclosed embodiments further include a pellet grill or smoker including a main body defining an internal cooking chamber, a burn pot assembly that provides heat to the cooking chamber by combusting pellets, a duct that extends from the burn pot assembly, and a passage that extends alongside a portion of an outer periphery of the cooking chamber and communicates with the duct. The passage begins at a lower end of the cooking chamber proximate the burn pot assembly and extends toward an upper end of the cooking chamber opposite the lower end. The pellet grill or smoker further includes a rack holder adapted to hold a rack and including an opening communicating the passage with the cooking chamber to provide a path for air flow from the burn pot assembly to the cooking chamber. The air flow path begins at the burn pot assembly and terminates at a gap between the passage and the upper end of the cooking chamber.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 3 is a partial broken front perspective view of the appliance according to at least one of the presently disclosed embodiments.

FIG. 5B is another top perspective view of an auger assembly according to at least one of the presently disclosed embodiments.

DETAILED DESCRIPTION OF THE EMBODIMENTS

Figure 1:
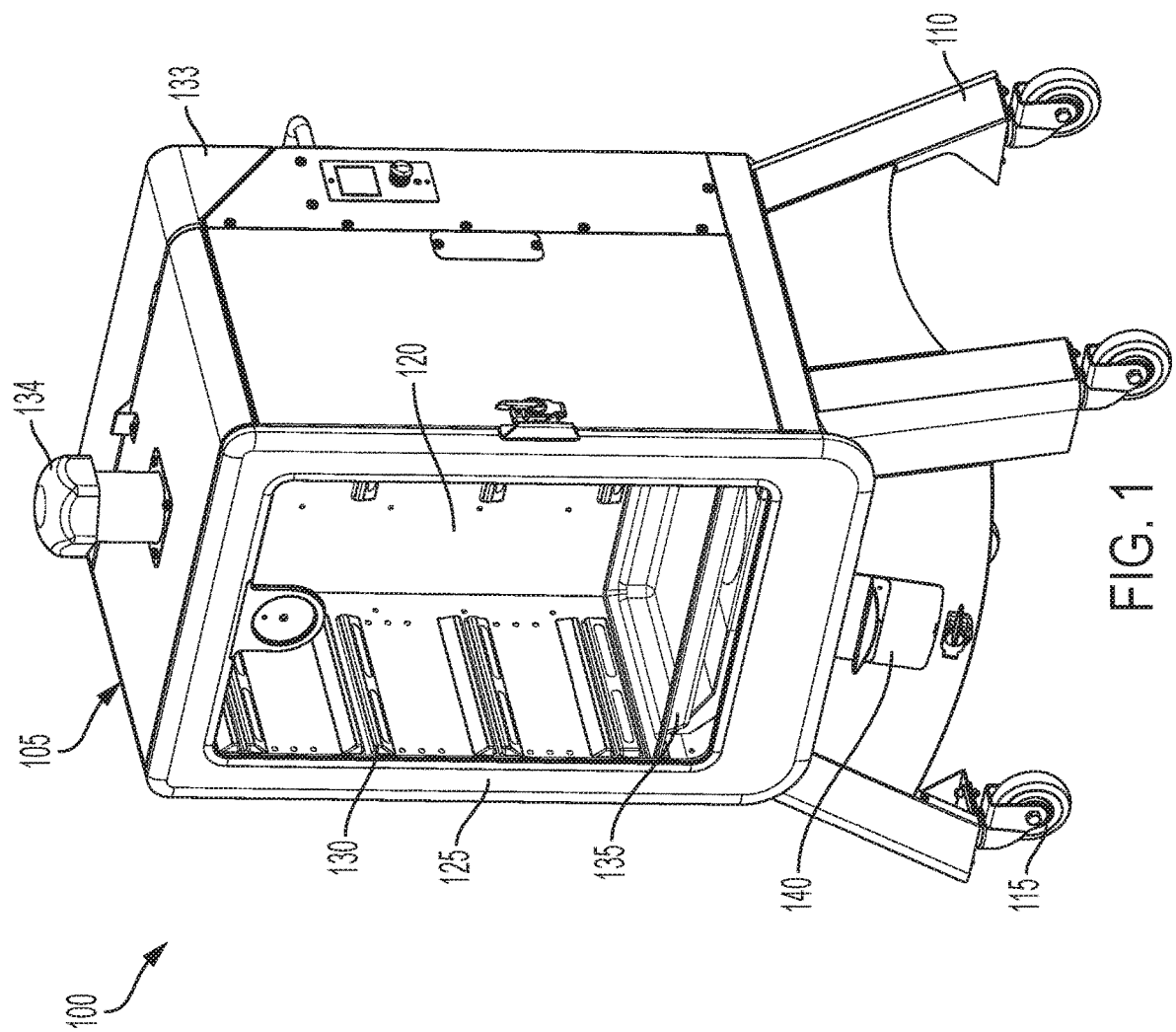
FIG. 1 is a front perspective view of an appliance according to at least one of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include an outdoor cooking appliance such as a smoker or grill with ductwork extending from the heat source of the appliance and leading to racks that hold grates where food rests during cooking. The racks can include openings that direct the smoke into the smoker at a higher velocity due to the smaller cross-sectional area openings as compared to the upstream ducts. The burn pot assembly can also be segregated from the grease pan to avoid the potential for grease fires.

As shown in FIG. 1, an appliance 100 includes a main body 105 coupled to a base 110 having wheels 115. Within the main body 105 is a cooking chamber 120 where food, for example, meat or vegetables, can be cooked in either a grilling or smoking application. The main body 105 can further include a door 125 on a first side of the main body 105 that allows the user access to the cooking chamber 120 so the user can retrieve or adjust the food being cooked within the cooking chamber 120. The main body 105 can also include rack holders 130 that hold racks where food can be placed during the cooking operation.

In certain exemplary embodiments, the appliance 100 is a pellet grill or smoker, for example, a vertical pellet smoker, although the present invention is not so limited. As shown, the appliance 100 can therefore include a hopper 133 on a second side of the main body 105 opposite the first side, and that receives pellets for operation in the pellet grill or smoker. This hopper 133 can be located on the rear of the appliance 100 for spatial reasons, as opposed to conventional pellet smokers, which include the hopper on the side in an offset nature. The appliance can further include a chimney 134 for directing exiting smoke and heat in an upwardly direction so as to provide the outlet for air flow through the appliance 100.

The main body 105 can further include a grease tray 135 for receiving grease or other external matter that is removed from the food inside the cooking chamber 120. The grease tray 135 can also receive water or flavored liquids such as apple juice or cider, to provide additional moisture to the cooking chamber 120 during use. The temperature inside the cooking chamber 120 can be adjusted and controlled by a controller 140 that can be set by a user to control the internal temperature of the cooking chamber 120. For example, a user can set the cooking chamber 120 to a temperature of 225 degrees, and the appliance will burn fuel or otherwise heat the cooking chamber 120 until the temperature reaches 225 degrees based on a temperature sensor located within the cooking chamber 120. Once the temperature reaches 225 degrees, the controller 140 will control the heating mechanism of the appliance to reduce or eliminate the supply of heat temporarily. For example, and without limitation, the controller 140 can then decrease the heat provided by preventing the supply of pellets to a burn pot, as described below in more detail. However, the appliance 100 is not limited to a pellet smoker or grill and the heat can be suspended by reducing or eliminating the power or current provided to an electronic heating element, as with a conventional electronic smoker.

Figure 2:
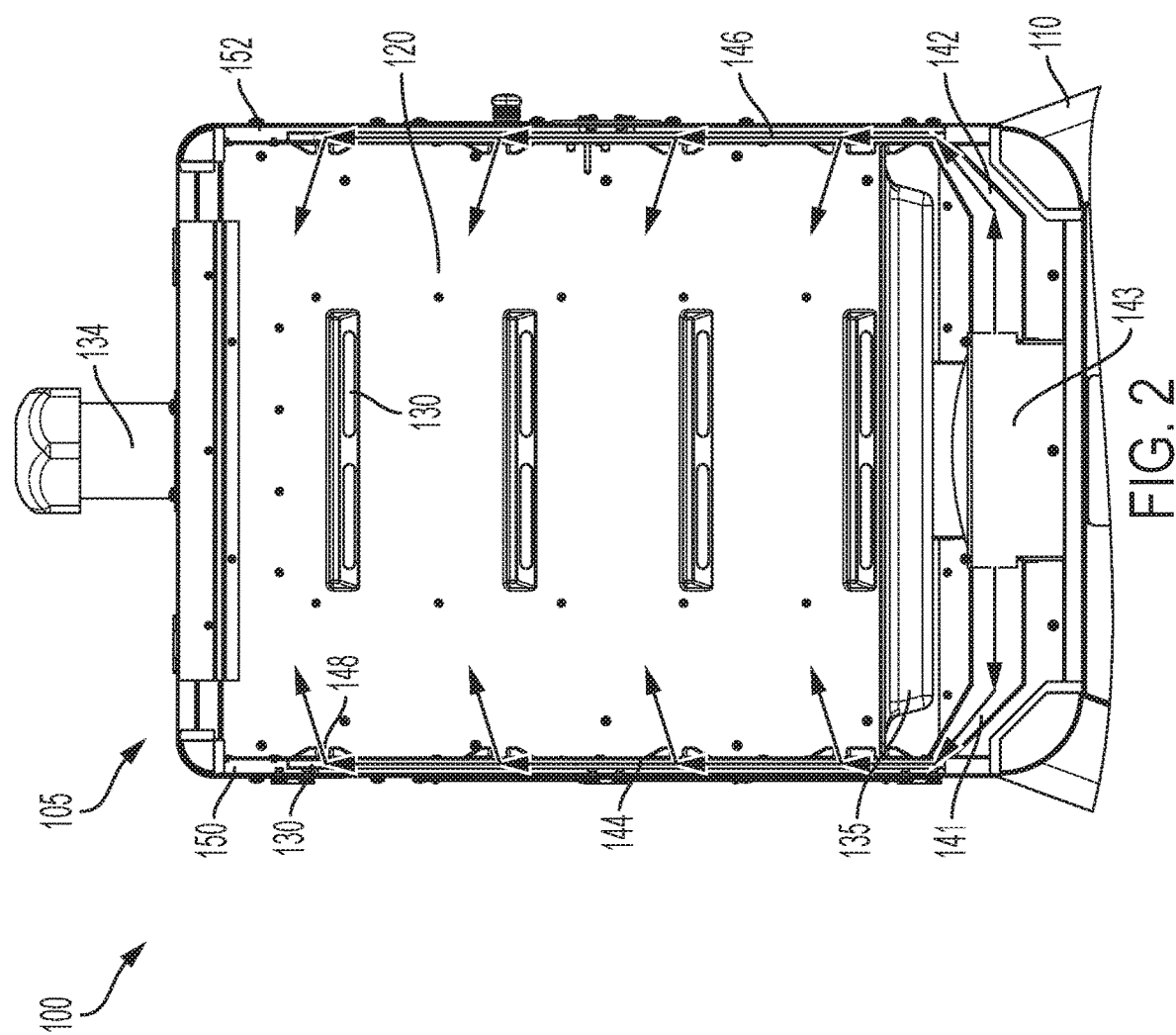
FIG. 2 is a partial broken front view of the appliance according to at least one of the presently disclosed embodiments.

FIG. 2 is a partial broken front view of the appliance 100; and FIG. 3 is a partial broken front perspective view of the appliance 100 according to at least one of the presently disclosed embodiments. For example, the view of FIG. 2 is similar to that of FIG. 1 but with the door 125 and some of the outer panels removed so as to expose a ductwork system of the appliance 100 that allows an advantageous flow of smoke and heat. As shown, the main body 105 can include first 141 and second 142 ducts extending from a burn pot assembly 143. The first 141 and second 142 ducts can therefore direct heat and smoke from the burn pot assembly 143 to first 144 and second 146 passages, respectively. For example, the first 144 and second 146 passages can be located on an outer periphery of the cooking chamber 120, as shown. The various rack holders 130 can include openings 148 that communicate with the first 144 and second 146 passages to allow smoke and heat to exit the passages 144, 146 through the openings 148 and into the main portion of the cooking chamber 120. As shown with arrows in FIG. 2, the heat and smoke flow from the burn pot assembly 143 through the ducts 141, 142 and into the passages 144, 146. The heat and smoke thereafter are expelled into the cooking chamber 120 via the openings 148 in the rack holders 130. Alternatively, the openings 148 can be provided in the passages 144, 146 themselves and not within the rack holders 130.

Due to the Bernoulli and chimney effect, the air flowing through the smaller cross-sectional area openings 148 enters the cooking chamber 120 at a higher velocity as compared to the velocity of the air flowing in the passages 144, 146 and ducts 141, 142 so as to provide a circulation of the air within the cooking chamber 120. For example, smoke from the burn pot assembly 143 can flow swiftly through the openings 148 and fill more of the cooking chamber 120 rather than simply passing through to the chimney 134. In doing so, the smoke can better penetrate the food being cooked and can more evenly cook the food within the cooking chamber 120.

The main body 105 can further include first 150 and second 152 gaps located at a top ends of the passages 144, 146 opposite bottom ends that communicate with the first 141 and second 142 ducts, respectively. These gaps 150, 152 allow heat and smoke to escape the passages 144, 146 rather than build up at the end of the passages 144, 146 over time. The gaps 150, 152 also allow the smoke and heat to deflect off upper corners of the cooking chamber 120 to provide more turbulent flow of the gas and, as discussed above, provide better circulation of the gas and smoke penetration of the meat.

As shown, the rack holders 130 protrude into the cooking chamber 120 and gradually narrow so as to direct the air in a higher velocity path through the openings 148. The rack holders 130 are also shown as extending from a front side of the cooking chamber 120 proximate the door 125 to a rear side of the cooking chamber 120 opposite the front side and distal to the door 125. However, any shape rack holder 130 can be implemented without departing from the spirit and scope of the presently disclosed embodiments. For example, the rack holder 130 can extend along the rear side of the cooking chamber 120 opposite the door 125 to provide even more circulation, for example as shown in FIG. 3.

As shown, the grease tray 135 can be segregated from the burn pot assembly 143 to avoid grease fires or other contamination of the grease in the burn pot assembly 143. For example, as shown in FIGS. 2 and 3, the grease tray 135 is spaced from and therefore does not contact any portion of the burn pot assembly 143. This arrangement is caused by the lowest of the rack holders 130 being located at a height that spaces the grease tray 135 held within the lowest of the rack holders 130 from contacting the burn pot assembly 143.

As shown, the openings 148 can be slots formed within the rack holders 130 to allow smoke or gas to escape into the cooking chamber 120. However, the openings 148 can be any size opening or hole, including circular, oval, rectangular, or multiple separate openings within the same rack holder 130.

Figure 4A:
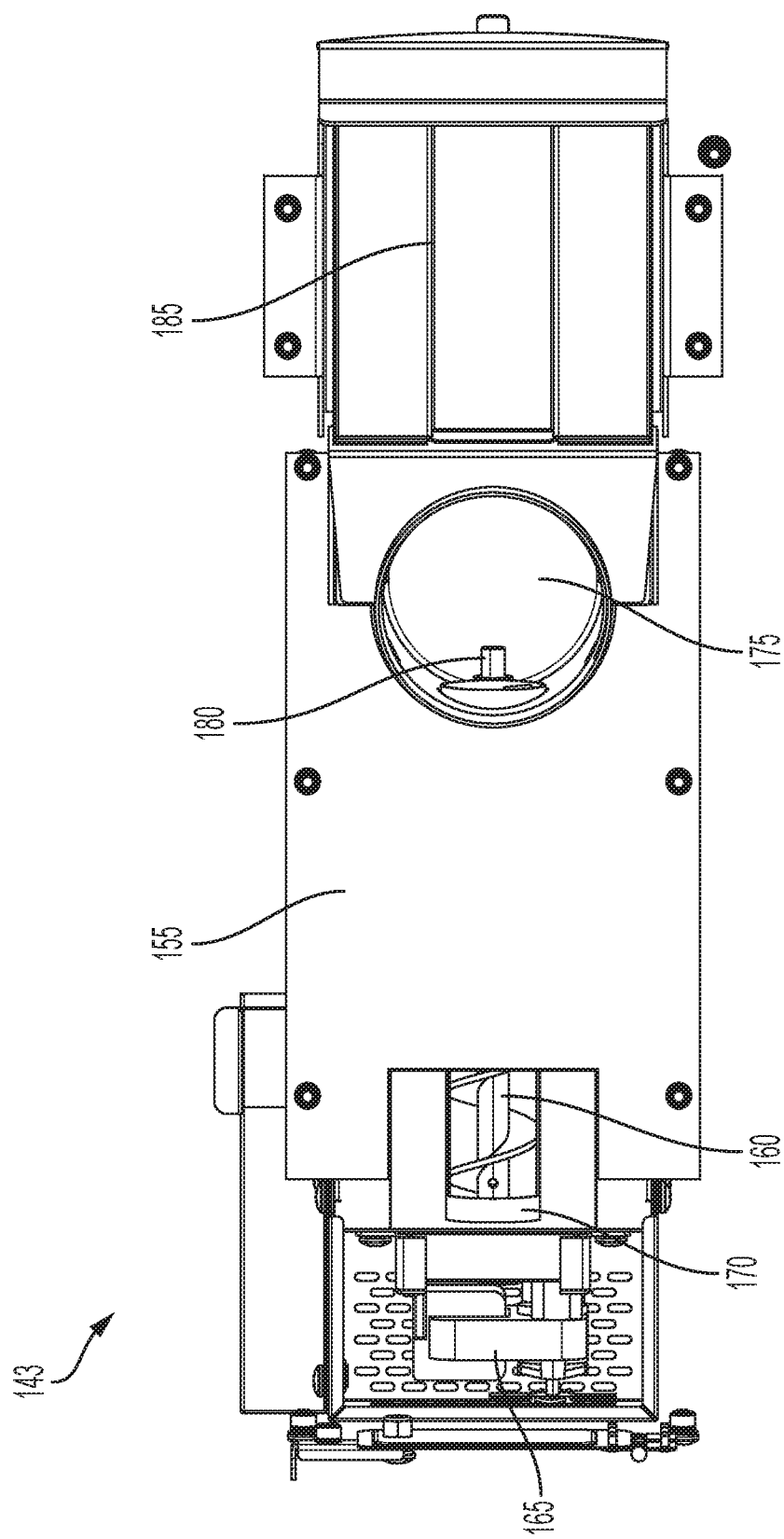
FIG. 4A is a top view of a burn pot assembly according to at least one of the presently disclosed embodiments.
Figure 4B:
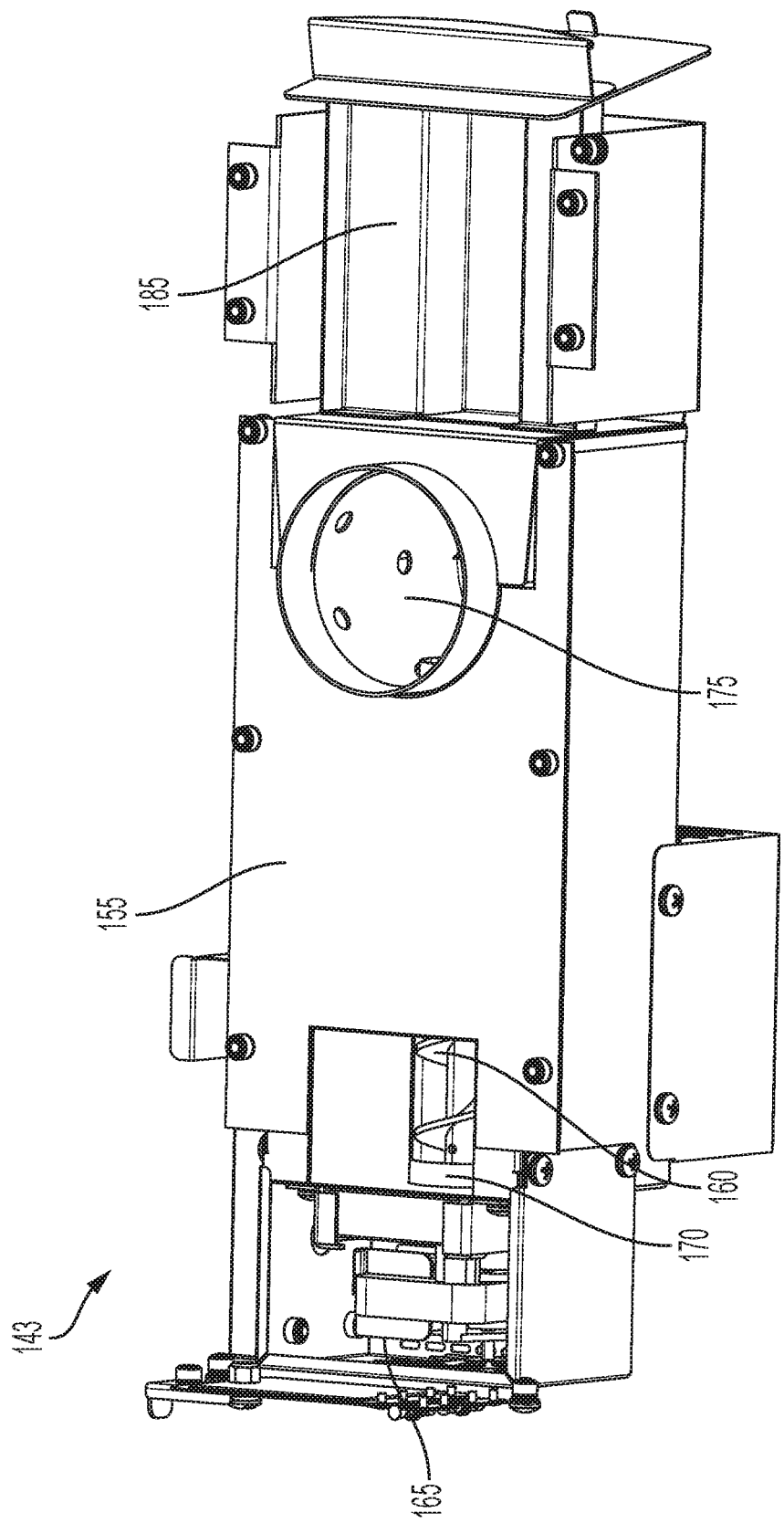
FIG. 4B is a top perspective view of a burn pot assembly according to at least one of the presently disclosed embodiments.

FIG. 4A is a top view of a burn pot assembly 143; and FIG. 4B is a top perspective view of a burn pot assembly 143, according to at least one of the presently disclosed embodiments. As shown, the burn pot assembly 143 can receive pellets from the hopper 133 and distribute them to a chamber in which the pellets are combusted to provide heat and smoke for the appliance 100. The heat and smoke can then flow through the ducts 141, 142 and passages 144, 146, and then out of the openings 148 and into the cooking chamber 120, as discussed above.

As shown, the burn pot assembly 143 can include a burn pot housing 155 that houses many of the internal components of the assembly 143, including an auger 160. The auger 160 can be powered by a motor 165 so as to receive pellets in a receiving area 170 and provide the pellets to a burn chamber 175 to be combusted by a hot rod 180. Once the process is complete, the ash remaining from the pellets can be removed by first removing an ash pull out 185 and then cleaning the burn chamber 175 with any known cleaning process.

The hot rod 180 is typically heated by providing an electric current as determined by the controller 140. The hot rod 180 can be metallic such that an electric current can heat the hot rod 180 and therefore cause nearby pellets to combust. However, the hot rod 180 can be heated by any other means, or the pellets or other fuel can be combusted or heated by any other means, without departing from the spirit and scope of the presently disclosed embodiments.

Figure 5A:
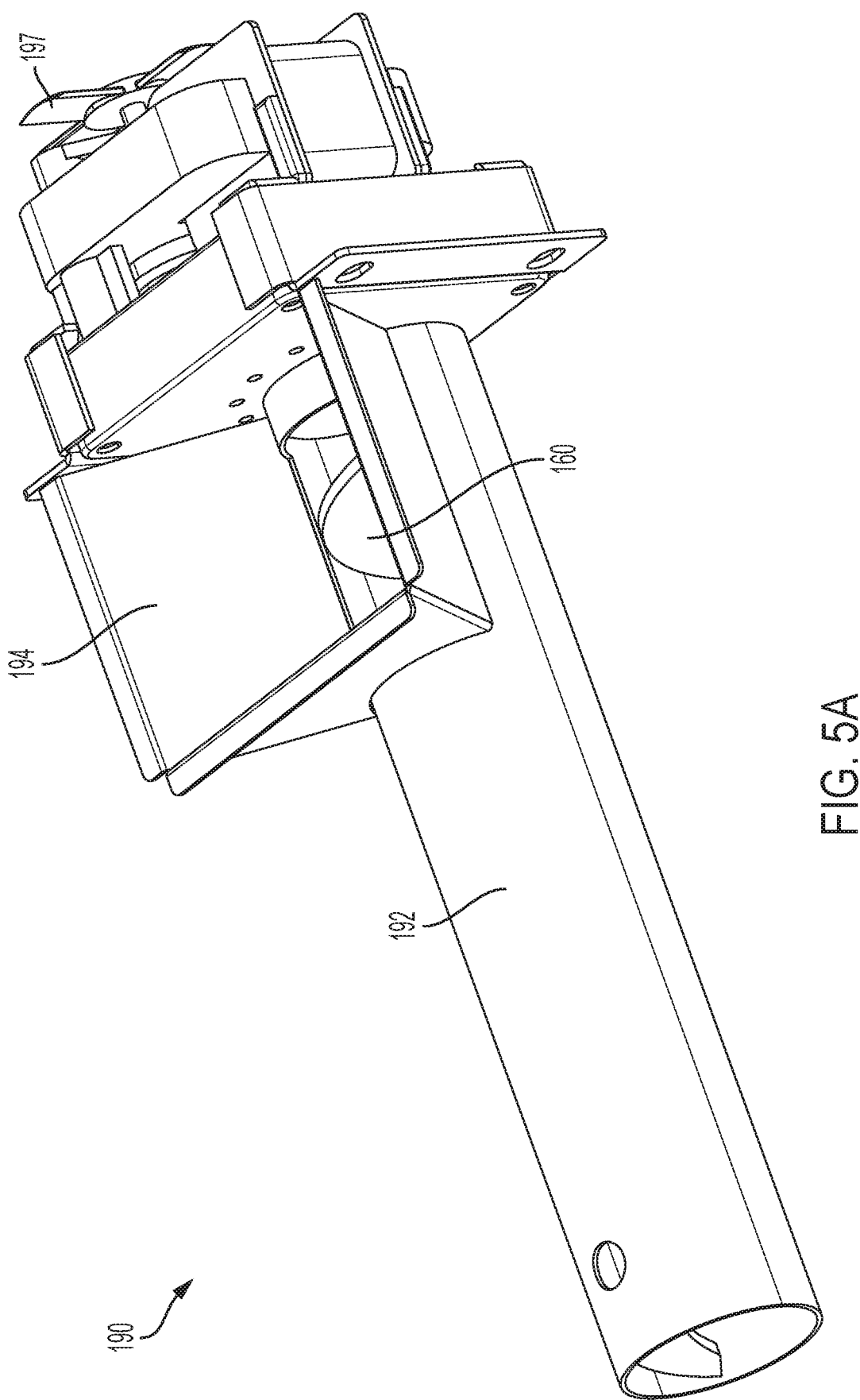
FIG. 5A is a top perspective view of an auger assembly according to at least one of the presently disclosed embodiments.

FIG. 5A is a top perspective view of an auger assembly 190; and FIG. 5B is a different top perspective view of the auger assembly 190 according to at least one of the presently disclosed embodiments. As shown, the auger assembly 190 can include an auger housing 192 that houses the auger 160 and a funnel 194 that directs pellets or other fuel to the auger 160 to provide the fuel to the burn chamber 175 for combustion. A fan 197 can provide air circulation so as to begin the flow of air or smoke through the cooking chamber 120 from the burn pot assembly 143.

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An appliance comprising:
a main body defining an internal cooking chamber;
a burn pot assembly that provides heat to the cooking chamber;
first and second ducts that respectively extends from the burn pot assembly;
first and second passages respectively extending alongside a portion of an outer periphery of the cooking chamber and respectively communicating with the first and second ducts, the first and second passages beginning at a lower end of the cooking chamber proximate the burn pot assembly and extending toward an upper end of the cooking chamber opposite the lower end; and
openings disposed on opposing first and second sides of the cooking chamber and communicating the first and second passages with the cooking chamber to provide a path for air flow from the burn pot assembly to the cooking chamber.

2. The appliance of claim 1, further comprising a rack holder extending within the cooking chamber, and wherein the openings are defined within the rack holder.

3. The appliance of claim 2, wherein the rack holder extends from a front end of the cooking chamber proximate a door, to a rear end of the cooking chamber opposite the front end and distal to the door.

4. The appliance of claim 3, wherein the rack holder extends toward an internal portion of the cooking chamber.

5. The appliance of claim 1, further comprising first and second gaps respectively disposed between the first and second passages and the upper end of the cooking chamber where air within the air flow path can exit the passage and enter the cooking chamber.

6. The appliance of claim 1, further comprising a grease pan spaced from the burn pot assembly.

7. The appliance of claim 6, further comprising rack holders for holding racks, wherein the grease pan is located on a lowest-most of the rack holders.

8. The appliance of claim 1, wherein the burn pot assembly is a pellet combustion burn pot assembly for a pellet smoker or grill.

9. The appliance of claim 1, further comprising a door located on a first side of the main body, and a hopper located on a second side of the main body opposite the first side, the hopper receiving pellets for combustion in the burn pot assembly.

10. The appliance of claim 1, further comprising an ash pull out tray located proximate the burn pot assembly.

11. The pellet grill or smoker of claim 10, wherein the first and second rack holders further extends toward an internal portion of the cooking chamber.

12. A pellet grill or smoker comprising:
a main body defining an internal cooking chamber;
a burn pot assembly that provides heat to the cooking chamber by combusting pellets;
first and second ducts that respectively extends from the burn pot assembly;
first and second passages respectively extending alongside a portion of an outer periphery of the cooking chamber and communicating with the first and second ducts, the first and second passages beginning at a lower end of the cooking chamber proximate the burn pot assembly and extending toward an upper end of the cooking chamber opposite the lower end; and
first and second rack holders adapted to hold a rack, disposed on opposing first and second sides of the cooking chamber, and respectively having an opening communicating the first and second passages with the cooking chamber to provide a path for air flow from the burn pot assembly to the cooking chamber, the air flow path beginning at the burn pot assembly and terminating at a respective gap between the first and second passages and the upper end of the cooking chamber.

13. The pellet grill or smoker of claim 12, wherein the first and second rack holders respectively extends from a front end of the cooking chamber proximate a door, to a rear end of the cooking chamber opposite the front end and distal to the door.

14. The pellet grill or smoker of claim 12, wherein the gap communicates the air flow path with the cooking chamber.

15. The pellet grill or smoker of claim 12, further comprising a grease pan spaced from the burn pot assembly.

16. The pellet grill or smoker of claim 15, wherein the grease pan is located on a lowest-most of the rack holders.

17. The pellet grill or smoker of claim 12, further comprising a door located on a first side of the main body, and a hopper located on a second side of the main body opposite the first side, the hopper receiving pellets for combustion in the burn pot assembly.

18. The pellet grill or smoker of claim 17, wherein one of the openings is located proximate the second side of the main body and communicates the passage with the cooking chamber.

19. The pellet grill or smoker of claim 12, further comprising an ash pull out tray located proximate the burn pot assembly.

\* \* \* \* \*

UNITED STATES PATENT AND TRADEMARK OFFICE
CERTIFICATE OF CORRECTION

PATENT NO. : 11,497,349 B2
APPLICATION NO. : 16/709543
DATED : November 15, 2022
INVENTOR(S) : Glen Meadows et al.

Page 1 of 1

It is certified that error appears in the above-identified patent and that said Letters Patent is hereby corrected as shown below:

In the Claims

In Column 5, in Claim 1, Line 56, change "extends" to "extend."

In Column 6, in Claim 11, Line 35, change "extends" to "extend."

In Column 6, in Claim 12, Line 41, change "extends" to "extend."

In Column 6, in Claim 13, Line 60, change "extends" to "extend."

Signed and Sealed this
Twenty-fifth Day of April, 2023

Katherine Kelly Vidal
*Director of the United States Patent and Trademark Office*